(12) United States Patent
Kuroiwa

(10) Patent No.: US 7,324,839 B2
(45) Date of Patent: Jan. 29, 2008

(54) COMMUNICATIONS CONTROL METHOD, COMMUNICATIONS CONTROL SYSTEM, AND WIRELESS TELEPHONE DEVICE

(75) Inventor: Hitoshi Kuroiwa, Chiba (JP)

(73) Assignee: Sony Corporation (JP)

( * ) Notice: Subject to any disclaimer, the term of this patent is extended or adjusted under 35 U.S.C. 154(b) by 332 days.

(21) Appl. No.: 10/175,646

(22) Filed: Jun. 19, 2002

(65) Prior Publication Data

US 2003/0003901 A1   Jan. 2, 2003

(30) Foreign Application Priority Data

Jun. 22, 2001   (JP) .......................... P2001-190165

(51) Int. Cl.
*H04B 1/38* (2006.01)
(52) U.S. Cl. ................. 455/567; 455/456.4; 455/456.3
(58) Field of Classification Search ................ 455/419, 455/421, 456.3, 456.4, 567
See application file for complete search history.

(56) References Cited

U.S. PATENT DOCUMENTS

| | | | | |
|---|---|---|---|---|
| 5,999,809 | A * | 12/1999 | Watanabe | 455/421 |
| 6,081,725 | A * | 6/2000 | Ishida | 455/462 |
| 6,343,212 | B1 * | 1/2002 | Weber et al. | 455/404.1 |
| 6,343,213 | B1 * | 1/2002 | Steer et al. | 455/411 |
| 6,438,216 | B1 * | 8/2002 | Aktas | 379/88.01 |
| 6,466,782 | B2 * | 10/2002 | Ishikawa et al. | 455/412.2 |
| 6,496,703 | B1 * | 12/2002 | da Silva | 455/456.4 |
| 6,505,048 | B1 * | 1/2003 | Moles et al. | 455/456.1 |
| 6,603,977 | B1 * | 8/2003 | Walsh et al. | 379/45 |
| 6,643,517 | B1 * | 11/2003 | Steer | 455/456.4 |
| 6,687,506 | B1 * | 2/2004 | Girod | 455/456.4 |
| 6,785,563 | B2 * | 8/2004 | Tsukamoto | 455/567 |
| 6,799,052 | B2 * | 9/2004 | Agness et al. | 455/456.4 |
| 6,898,445 | B2 * | 5/2005 | Slettengren et al. | 455/567 |
| 2001/0043680 | A1 * | 11/2001 | Scheel | 379/70 |
| 2002/0090953 | A1 * | 7/2002 | Aburai et al. | 455/456 |

FOREIGN PATENT DOCUMENTS

| | | |
|---|---|---|
| JP | 2000-078658 A | 3/2000 |
| JP | 2000-092190 A | 3/2000 |

* cited by examiner

*Primary Examiner*—Lester G. Kincaid
*Assistant Examiner*—Fred Casca
(74) *Attorney, Agent, or Firm*—Lerner, David, Littenberg, Krumholz & Mentlik, LLP

(57) ABSTRACT

An antenna of a wireless interface is installed in a communications suppressing area, and a communications suppressing signal is transmitted. When a wireless telephone device receives this signal, its operation mode set to suppression mode so that when a call is received, an absence notification message is notified automatically. Area information indicating the kind of place the communications suppressing area is provided in the communications suppressing signal, and the absence notification message is generated according to this information. When a call is received during the suppression mode, selection of a response operation is prompted and, if selected, the selected response operation is performed. When a suppression releasing signal is received from an antenna installed in a non-communications suppressing area, or when the duration over which the communications suppressing signal is not received exceeds a preset period, the operation mode is switched from the suppression mode to the communications mode.

8 Claims, 5 Drawing Sheets

F I G. 4
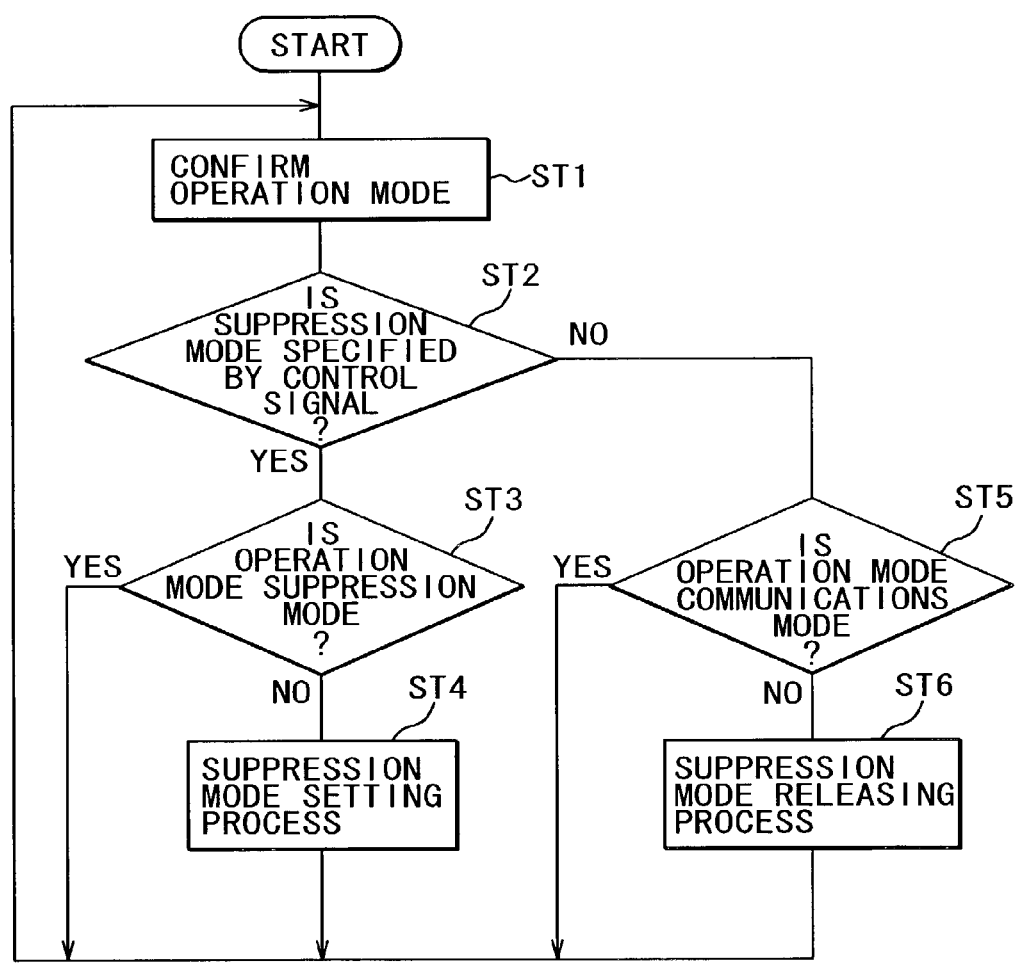

COMMUNICATIONS CONTROL METHOD, COMMUNICATIONS CONTROL SYSTEM, AND WIRELESS TELEPHONE DEVICE

CROSS REFERENCE TO RELATED APPLICATIONS

The present document is based on Japanese Priority Document JP 2001-190165, filed in the Japanese Patent Office on Jun. 22, 2001, the entire contents of which are incorporated herein by reference to the extent permitted by law.

BACKGROUND OF THE INVENTION

1. Field of the Invention

The present invention relates to a communications control method, a communications control system, and a wireless telephone device. More particularly, the present invention relates to a communications control method, a communications control system, and a wireless telephone device in which communications may be suppressed by way of a communications suppressing signal, and in which when communications is suppressed, an automatic response is performed upon reception of an incoming call.

2. Description of the Related Art

With the spread of wireless telephone devices, in places where ring tones of wireless telephone devices and conversations using these devices may be considered inconsiderate by others, for example, inside vehicles of public transport such as trains and buses as well as in concert halls, it is becoming common to request that usage of wireless telephone devices be refrained from or to take measures to disable communications. It is also requested that usage of wireless telephone devices while driving be refrained from in order to prevent accidents.

To meet such requests, as disclosed, for example, in Japanese Patent No. 2,938,059 "Calling Apparatus and Method for a Mobile Telephone Device for Use in Automobiles," a mobile telephone device is prohibited to signal an incoming call while the user is driving a car at low speed or even while the user is stopped at a red light. Also, as disclosed in Japanese Patent Application Publication No. 2000-92190 "Method of Absence Notification for a Wireless Telephone Device," an absence notification message is pre-recorded, and when an in-coming call is received, a caller is notified with a preset absence notification message.

Further, for cases where the safety or whereabouts of an elderly or visually handicapped person who is away needs to be ascertained immediately, patent applications have been filed for inventions which enable multi-modal absence notification messages, or selection of the kind of absence notification to be performed from options such as "business negotiation" "meeting" "sleeping" "eating" "bathing" "theatre" "train" "lecture" "attending to a customer" so that the reason a call cannot be answered is clarified In the above-mentioned method, because an operation mode for notifying an absence notification message by way of an automatic response must be set in advance, it isn't exactly easy to use. Further, modes in which communications is disabled render the wireless telephone device unusable, however, in an emergency, unless the wireless telephone device is made usable, be it inside vehicles of public transport, convenience is lost.

SUMMARY OF THE INVENTION

The present invention provides a communications control method, a communications control system and a wireless telephone device which, in areas where communications suppression is desired, make it possible to automatically notify a caller with an absence notification message upon receiving an incoming call, while, at the same time, enabling information to be communicated with the caller in an emergency.

The communications control method according to an embodiment of the present invention is one in which a reception range for communications suppressing signals is set as a communications suppressing area by transmitting the communications suppressing signals via a wireless interface, and when a wireless telephone device which performs communications via a base station receives the communications suppressing signals via the wireless interface, an automatic response is performed upon reception of an incoming call and a caller is notified with a message. Further, the communications suppressing signals contain area information indicating the type of place of the communications suppressing area, and the wireless telephone device notifies a message generated according to the area information upon reception of an incoming call. Moreover, suppression releasing signals are transmitted via the wireless interface. When suppression releasing signals are received via the wireless interface or when the communications suppressing signals are not received for a preset period of time, the wireless telephone device deactivates the automatic response performed upon receiving an incoming call and performs a calling process upon receiving an incoming call.

The communications control system according to an embodiment of the present invention comprises communications suppressing area setting means for setting a reception range for communications suppressing signals as a communications suppressing area by transmitting the communications suppressing signals via a wireless interface, and a wireless telephone device which performs communications via a base station. The wireless telephone device comprises reception means for receiving signals transmitted via the wireless interface, and control means for performing an automatic response and notifying a message upon receiving an incoming call when the communications suppressing signals are received by the reception means. Also, at the communications suppressing area setting means, the communications suppressing signals are provided with area information indicating the type of place of the communications suppressing area, and the control means of the wireless telephone device, upon receiving an incoming call, notifies a notification message generated based on the area information of the communications suppressing signals received by the reception means. Further, there is provided communications suppression releasing means for transmitting suppression releasing signals using the wireless interface, so that when the suppression releasing signals are received by the reception means or when the communications suppressing signals are not received for a preset period of time by the reception means, the control means deactivates the automatic response performed upon receiving an incoming call and performs a a calling process (by tone or any other appropriate means) upon receiving an incoming call.

The wireless telephone device according to an embodiment of the present invention includes communications means for performing communications via a base station, reception means for receiving signals transmitted using a wireless interface, and control means for controlling a communications operation upon receiving an incoming call according to signals received by the reception means. If the reception means receives signals for suppressing communications, the control means performs an automatic response upon receiving an incoming call via the communications means, and notifies a message via the communications means. Furthermore, if the communications suppressing signals contain area information indicating the type of place, the control means notifies a message generated based on the area information. Moreover, when communications suppression releasing signals are received by the reception means, or when the communications suppressing signals are not received for a preset period of time, the control means deactivates the automatic response and performs the calling process upon receiving an incoming call via the communications means. In addition, the control means notifies a message prompting a caller to select a response operation, and when a selection result is indicated by the caller via the communications means in response to the notification message, the control means performs the selected response operation.

In an embodiment of the present invention, an antenna of the wireless interface is installed in a communications suppressing area such as inside a train, and the communications suppressing signals are transmitted. When the communications suppressing signals are received by the wireless telephone device which performs communications via the base station, the operation mode of the wireless telephone device is set to a suppression mode. Also, when an incoming call is received while in the suppression mode, an automatic response is performed, notifying a caller with an absence notification message. Further, if the communications suppressing signals contain area information indicating the type of the communications suppressing area, a message generated based on the area information is notified. Still further, upon receiving an incoming call while in the suppression mode, a message prompting selection of a response operation is notified to the caller, and when a response operation is selected by the caller, the selected response operation is performed. For example, in an emergency, a phone conversation may be conducted, or response operations such as recording a text message or automatic voice recording are performed.

In an area where communications suppression is unnecessary, suppression releasing signals are transmitted, and if the suppression releasing signals are received by the wireless telephone device or if the communications suppressing signals are not received for a period longer than a preset period of time, the suppression mode is released and the operation mode is switched to a communications mode.

According to an embodiment of the present invention, the reception range for the communications suppressing signals is set as the communications suppressing area by transmitting the communications suppressing signals via the wireless interface. In addition, when the wireless telephone device which performs communications via the base station receives the communications suppressing signals via the wireless interface, an automatic reponse is performed upon receiving an incoming call and a message is notified. Consequently, in the communications suppressing area, the operation mode is switched automatically and communications can be suppressed without having to operate the wireless telephone device such that it is in the operation mode for suppressing communications.

Moreover, the communications suppressing signals contain the area information indicating the type of place of the communications suppressing area, and upon reception of an incoming call, the wireless telephone device notifies a caller with a message generated based on the area information. Therefore, the caller can identify the reason communications is being suppressed, and can thus respond appropriately to the suppression of communications.

Also, when the suppression releasing signals are received, the automatic response performed upon receiving an incoming call is deactivated, and instead a calling process is performed upon receiving an incoming call. Hence, an operation for releasing the operation mode for suppressing communications can be performed automatically. Further, since the automatic response performed upon receiving an incoming call is deactivated when the communications suppressing signals are not received for a preset period of time, and instead the calling process is performed upon receiving an incoming call, the operation mode for suppressing communications can be released by moving away from the communications suppressing area without requiring the suppression releasing signal.

Moreover, a message prompting the caller to select a response operation is notified from the wireless telephone device, and if a selection result in response to the prompt message is indicated on the caller side, the selected response operation is performed. Accordingly, the most appropriate response operation such as conversing over the phone or leaving a message can be selected on the caller side depending on the urgency of the content to be communicated.

BRIEF DESCRIPTION OF THE DRAWINGS

The invention disclosed herein will become better understood as a detailed description is made of the preferred embodiments with reference to the appended drawings in which:

FIG. 4 is a flowchart showing an operation mode switching process according to the present invention.

DETAILED DESCRIPTION OF THE PREFERRED EMBODIMENTS

Figure 1:
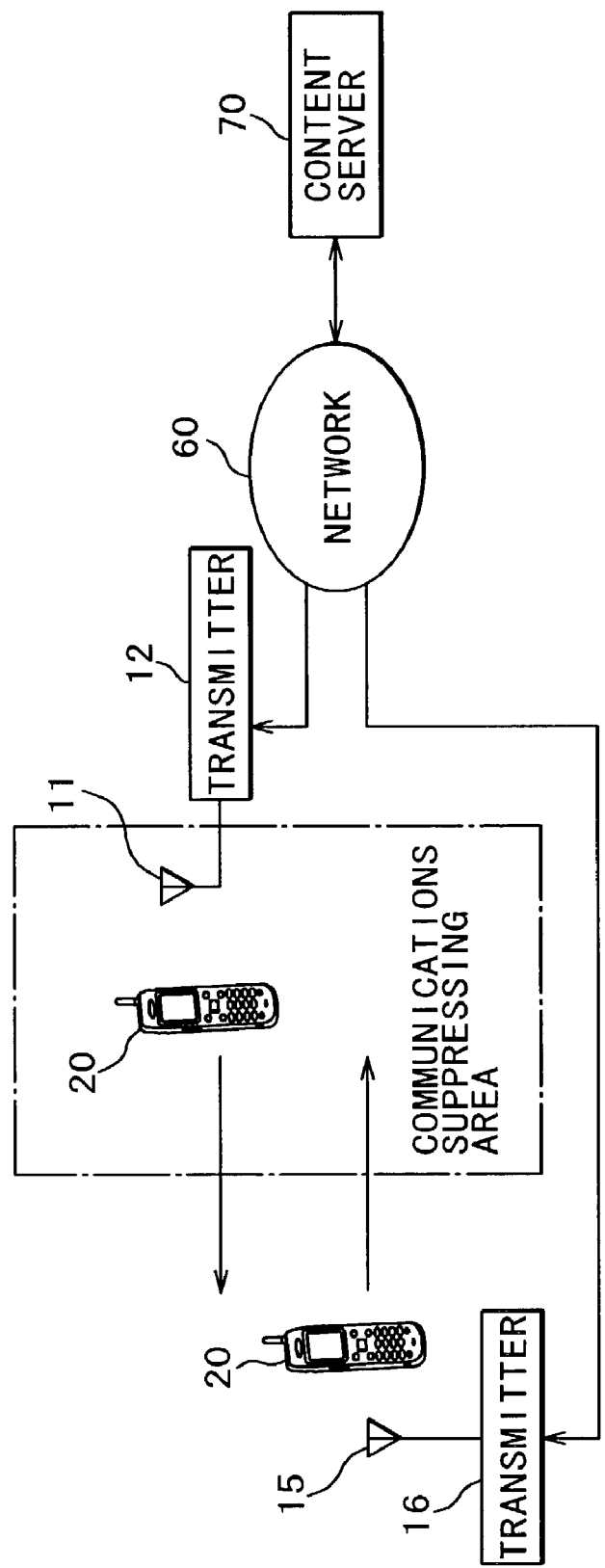
FIG. 1 shows a configuration of a communications control system according to the present invention.

An embodiment of the present invention will be described below with reference to the accompanying drawings. FIG. 1 shows a configuration of a communications control system which, when moved to an area in which communications is suppressed, can control communications by automatically switching an operation mode of a wireless telephone device which is a terminal such as a mobile phone or a PHS (Personal Handy-phone System) to a suppression mode, and which can output an appropriate absence notification message when communications is suppressed.

A radio antenna 11 is to be set up in an area in which it is desired that communications be suppressed, and a reception range for communications suppressing signals transmitted from the radio antenna 11 is set as a communications suppressing area. Also, when a wireless telephone device 20 is inside the communications suppressing area and receives the communications suppressing signals, the operation mode is set to the suppression mode, an automatic response is performed upon reception of an incoming call, and an absence notification message is notified. Further, when a period of time during which communications with the radio antenna 11 cannot be established exceeds a preset period of time, or when suppression releasing signals transmitted from a radio antenna 15 installed in an area where communications is not suppressed are received, the suppression mode is lifted and the normal operation mode is activated, that is, a calling process is performed upon receiving an incoming call. For communications between the radio antenna 11 and the wireless telephone device 20, a wireless interface, for example, wireless LAN (Local Area Network) used in wireless networks or Bluetooth which is a short-range wireless connection technology, is employed. By using such wireless interfaces with narrow communications ranges, it becomes possible to fine tune the communications suppressing area, thus facilitating distinction between the communications suppressing area and other areas. Moreover, when the radio antenna 15 is installed, it is possible to switch the operation mode in accordance with the movement of the wireless telephone device 20.

The radio antenna 11 is connected to a transmitter 12, and the transmitter 12 is connected to a content server 70 via a network 60 such as the internet which uses wired or wireless LAN or public lines. By connecting the radio antenna 11 with the transmitter 12 and the content server 70 as described above, communications suppressing area setting means is configured. Likewise, the radio antenna 15 is connected to a transmitter 16, and the transmitter 16 is connected to the content server 70 via the network 60. By connecting the radio antenna 15 with the transmitter 16 and the content server 70, communications suppression releasing means is configured.

The content server 70 controls operations of the transmitter 12 by feeding transmission control information to the transmitter 12 such that the communications suppressing signals are outputted from the radio antenna 11 installed in an area in which communications is suppressed. Also, operations of the transmitter 16 are controlled by feeding transmission control information to the transmitter 16 such that the suppression releasing signals are outputted from the radio antenna 15 installed in an area where communications need not be suppressed.

Figure 2:
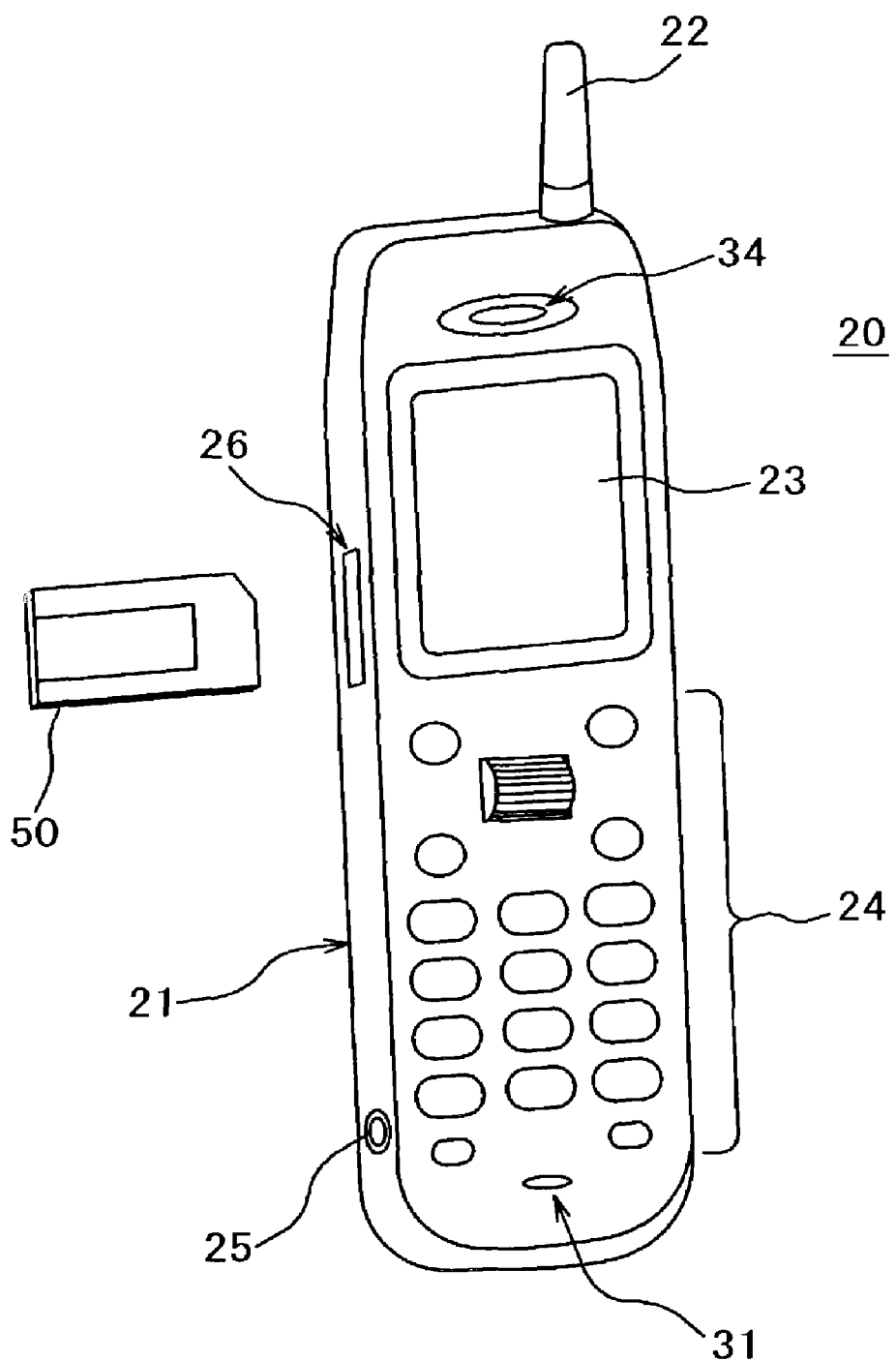
FIG. 2 shows an external appearance of a wireless telephone device according to the present invention.

FIG. 2 shows an external appearance of a wireless telephone device. A housable antenna 22 which can be pulled from a top surface of a case 21 is installed to the wireless telephone device 20. Also, on a front surface of the case 21, there is provided a display section 23 using a low power consuming display device, for example, a liquid crystal display device. Below the display section 23, there is provided an operation section 24 which is operated to dial numbers, input characters or to select various functions.

Inside the lower part of the front surface of the case 21, there is installed a microphone 31, and inside the upper part of the case 21, there is provided a speaker 34. Further, on a side surface of the case 21, there are provided a headphone jack 25 and a slot 26 for loading a memory card 50, which is a detachable memory device, for example a "Memory Stick" (registered trademark of Sony Corporation).

Figure 3:
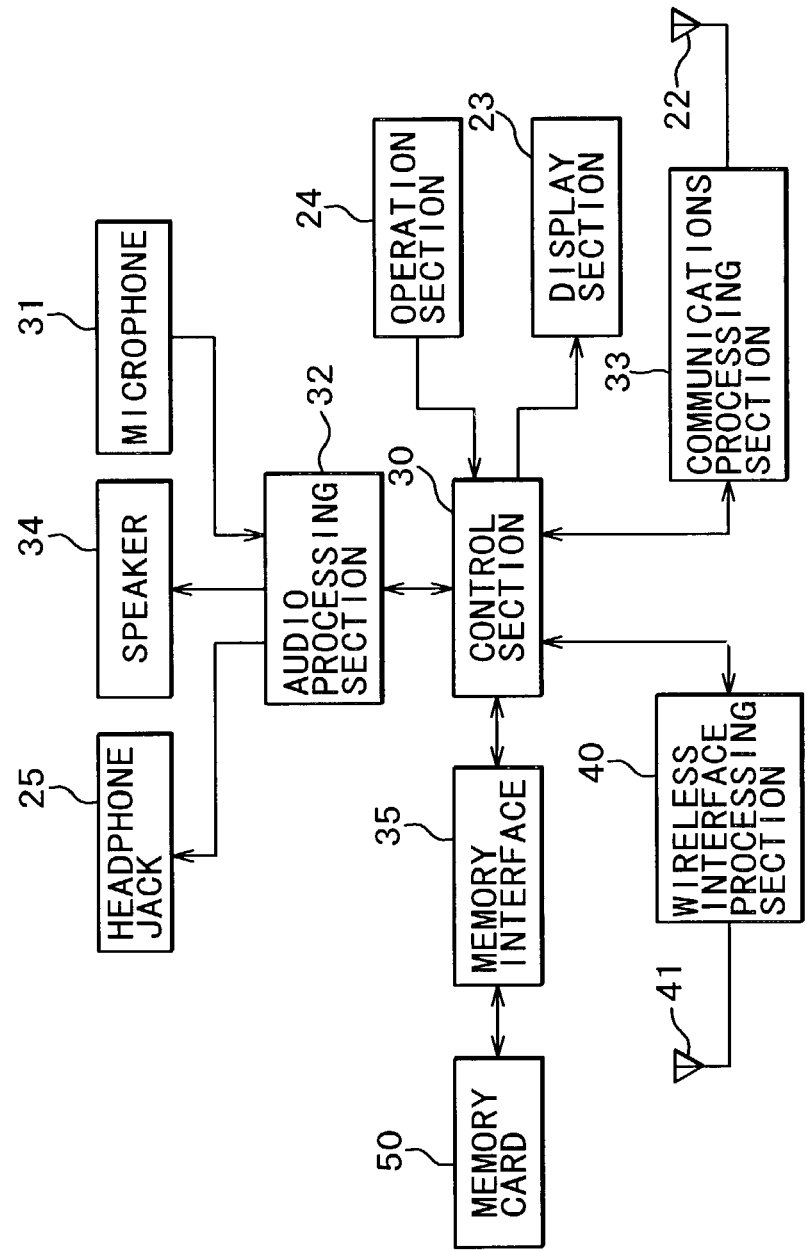
FIG. 3 shows a configuration of a wireless telephone device according to the present invention.

FIG. 3 shows a configuration of a wireless telephone device. A control section 30 has a CPU, a ROM, and a RAM. By loading a basic program or application programs pre-stored in the ROM into the RAM and activating these programs, each section connected to the control section 30 is controlled according to the loaded programs. Further, in the RAM, as described later, data such as text messages and voice are stored.

Analog audio signals from the microphone 31 are supplied to an audio processing section 32 and are supplied to the control section 30 after being converted to digital audio signals.

The operation section 24 is connected to the control section 30, and a telephone number of a specified party is supplied to a communications processing section 33 by operating the operation section 24. At the communications processing section 33, line connection with the specified party is established by modulating and sending out signals supplied from the control section 30 from the antenna 22 to the base station. When a line connection is established with the specified party, audio which is picked up by the microphone 31 is transmitted to the specified party by sending out from the antenna 22 to the communications processing section 33 encoded signals supplied from the audio processing section 32. Also, information which is generated by operating the operation section 24 or which is stored in the memory card 50 loaded into the slot 26 is supplied to the communications processing section 33, so that transmission of various information, and not only audio, to another party can be performed.

Signals received by the antenna 22 are processed at the communications processing section 33, and when encoded signals are received from another party, the encoded signals are supplied to the audio processing section 32 from the control section 30. At the audio processing section 32, a decoding process of the supplied encoded signals is performed to generate digital audio signals, and the digital audio signals are converted to analog audio signals and are then supplied to the speaker 34. Thus, audio from the other party is outputted from the speaker 34. Also, since the analog audio signals outputted from the audio processing section 32 can be supplied not only to the speaker 34 but also to the headphone jack 25, headphones may be used to listen to audio from the other party.

Further, when signals received by the antenna 22 are processed at the communications processing section 33 to produce data signals, display signals based on these signals are generated by the control section 30 and are supplied to the display section 23. As a result, the contents of e-mails and the like can be displayed on the display section 23.

Still further, a memory interface 35 is connected to the control section 30. The memory interface 35 connects the memory card 50 inserted into the slot 26 and the control section 30. For example, information such as email supplied from another party or downloaded music data is stored in the memory card 50 via the memory interface 35. Also, by storing in advance information created by computer apparatuses and the like in the memory card 50, transmission of information to another party is facilitated by transmitting the stored information read via the memory interface 35. Moreover, by storing information about another party in the memory card 50, and using the stored information to perform operations of the wireless telephone device 20, or by storing application data in the memory card 50, it is possible to update and expand functions of the wireless telephone device 20.

In addition, a wireless interface processing section 40 which is a reception means is connected to the control section 30. Note that an antenna 41 is connected to the wireless interface processing section 40, although not illustrated as such in FIG. 2. In this instance, when the communications suppressing signals or the suppression releasing signals transmitted from the radio antennas 11 or 15 are received via the antenna 41, a demodulation process and the like of the received signals are performed at the wireless interface processing section 40, and control signals thus obtained are supplied to the control section 30. At the control section 30, the operation mode of the wireless telephone device is set based on the control signals supplied from the wireless interface processing section 40. Also, an absence notification message is generated using information supplied from the content server 70.

Next, an operation mode switching process of the wireless telephone device 20 upon reception of signals transmitted from the antennas 11 and 15 is described with reference to the flowchart in FIG. 4. When operation of the wireless telephone device 20 starts, and signals transmitted from the antennas 11 and 15 are received, the control section 30 confirms in step ST1 the operation mode of the wireless telephone device 20.

In step ST2, it is determined, based on the control signals supplied from the wireless interface processing section 40 after receiving signals transmitted from the antennas 11 and 15, whether or not an operation mode for suppressing communications (hereinafter referred to as "suppression mode") has been specified. Here, the communications suppressing signals, that is, signals specifying the suppression mode as the operation mode of the wireless telephone device 20 are transmitted from the radio antenna 11 installed in the communications suppressing area. Further, not only do the communications suppressing signals specify the suppression mode, but they also contain area information which makes it possible to identify the type of place and hence why communications is suppressed. Still further, the suppression releasing signals, that is, signals specifying an operation mode which does not suppress communications of the wireless telephone device 20 (hereinafter referred to as "communications mode") are outputted from the radio antenna 15 installed in an area where communications is not suppressed.

In step ST2, if signals received based on the control signals supplied from the wireless interface processing section 40 are determined to be specifying the suppression mode, the process proceeds to step ST3, and if the signals are not determined to be specifying the suppression mode, the process proceeds to step ST5.

In step ST3, it is determined whether or not the operation mode confirmed in step ST1 is the suppression mode. If it is the suppression mode, the process returns to step ST1, and when the control signals are supplied, determination as to whether the suppression mode is specified by the control signals is continued Also, if the confirmed operation mode is not the suppression mode, the process proceeds to step ST4.

In step ST4, the operation mode of the wireless telephone device 20 is set to the suppression mode, and the process returns to step ST1. Also, in step ST4, if the area information is contained in the control signals supplied from the wireless interface processing section 40, the area information is used to generate an absence notification message.

If the signals received in step ST2 are not determined to be specifying the suppression mode, and the process proceeds to step ST5, in step ST5, it is determined whether or not the operation mode confirmed in step ST1 is the communications mode, and if it is the communications mode, the process returns to step ST1. If the confirmed operation mode is not the communications mode, the process proceeds to step ST6, whereupon the operation mode of the wireless telephone device 20 is set to the communications mode, and the process returns to step ST1.

Thus, upon reception of signals from the antenna 11 installed in the communications suppressing area, the operation mode is automatically set to the suppression mode, and upon reception of signals from the antenna 15 installed in an area where communications is not suppressed, the operation mode is automatically set to the communications mode, thus making an external operation to switch the operation mode of the wireless telephone device unnecessary.

Further, a process in which the duration over which the communications suppressing signals are not received is identified may be provided, and a process in which when the duration over which the communications suppressing signals are not received is shorter than a preset period of time, the suppression mode is maintained, and in which when the duration over which the communications suppressing signals are not received exceeds the preset period of time, the suppression mode is lifted and the operation mode returns to the communications mode may be provided in the process shown in FIG. 4. In this case, the operation mode of the wireless telephone device 20 can automatically be switched to the communications mode once the wireless telephone device 20 is moved away from the communications suppressing area and the communications suppressing signals from the radio antenna 11 are no longer received, without installing the radio antenna 15 in an area where communications is not suppressed.

Figure 5:
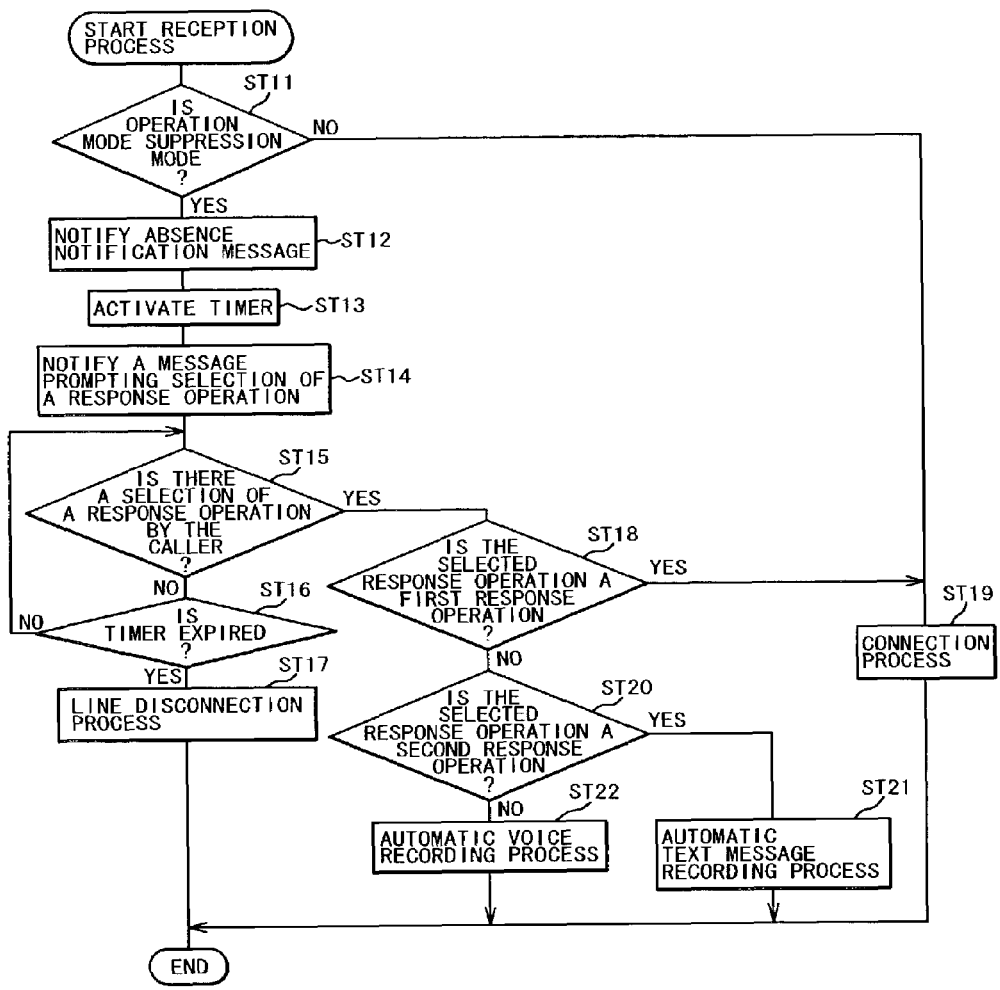
FIG. 5 is a flowchart showing a reception process according to the present invention.

Next, a reception process at the control section 30 when call signals are supplied from the base station to the wireless telephone device 20 is explained with reference to the flowchart of FIG. 5. In a case where an incoming call is received by the wireless telephone device 20 while the operation mode is set to the suppression mode, a response operation can be selected from a first response operation for conversing over the phone due to an emergency, a second response operation for leaving a text message, and a third response operation for recording an audio message by using an automatic voice recording function.

In step ST11, it is determined whether or not the operation mode is set to the suppression mode. In this case, when the communications suppressing signals from the radio antenna 11 are received by the wireless telephone device 20, and the operation mode is thus set to the suppression mode, the process proceeds to step ST12. In addition, when the communications suppressing signals are not received and the operation mode is thus set to the communications mode, the process proceeds to step ST19.

In step ST12, an automatic response is performed and an absence notification message is notified to the caller. Here, if area information is included in the control signals from the wireless interface processing section 40 and an absence notification message is generated using the area information, the generated absence notification message is notified to the caller. Further, if an absence notification message is not generated based on the area information, a pre-registered absence notification message is notified.

For example, when the communications suppressing signals transmitted from the radio antenna 11 installed inside a train are received, if the control signals from the wireless interface processing section 40 contain area information indicating that the wireless telephone device 20 is inside a train, an absence notification message saying "I am on a train at the moment," is generated and notified. Also, when the communications suppressing signals transmitted from the radio antenna 11 installed inside a theater are received, if the control signals from the wireless interface processing section 40 contain area information indicating that the wireless telephone device 20 is inside a theater, an absence notification message saying "I am in a theatre at the moment" is generated and notified. Further, if area information indicating that the wireless telephone device 20 is inside an automobile, a conference room or a classroom is included, an absence notification message appropriate for the corresponding communications suppressing area such as, "I am driving at the moment," "I am in a meeting at the moment" or "I am in the middle of a lecture at the moment" can be automatically notified. Also, information may be added to the absence notification message thus generated by operating the operation section 24 before the message is outputted. For example, by adding information such as "the ride will last another hour" to the message "I am on a train at the moment," or by adding information such as "the lecture will finish at 15:00" to the message "I am in the middle of a lecture at the moment," better detailed absence notification messages can be notified.

Next, after a timer is activated in step ST13, a message prompting selection of a response operation is outputted in step ST14, and the process proceeds to step ST15. Here, if the response operation of the wireless telephone device 20 can be selected from the three response operations mentioned above, for example, a prompt message such as "In case of an emergency, Select #1. To leave a text message, select #2. To leave a voice message, select #3 and record your message after the tone," is outputted.

In step ST15, it is determined whether or not a response operation was selected by the caller in response to the outputted prompt message. Here, if the caller selected none of the response operations, the process proceeds to step ST16. If any one of the response operations was selected, the process proceeds to step ST18.

In step ST16, it is determined whether or not the timer has expired. Here, if a preset timer duration has not lapsed since timer operation was activated in step ST13, the process returns to step ST15. Also, if it is determined that the preset timer duration has lapsed, and that the timer is expired, the process proceeds to step ST17. In step ST17, from the fact that a selection of the response operation was not performed within the timer duration, it is assumed that a regular connection (phone call), or a storage process for storing information such as a vocal, audio or text message is unnecessary, and a line disconnection process is therefore performed to terminate the reception process.

When a response operation is selected and the process proceeds from step ST15 to step ST18, it is determined in step ST18 whether or not the selected response operation is the first response operation for talking over the phone due to an emergency. If the selected response operation is determined in step ST18 to be the first response operation, the process proceeds to step ST19, and if it is not determined to be the first response operation, the process proceeds to step ST20.

When the process proceeds from step ST18 to step ST19, or when the process proceeds from step ST11 to step ST19 because it is not determined in step ST11 that the operation mode is the suppression mode, the connection process is performed in step ST19 and the reception process terminates. In other words, a line connection is established when a communications initiating operation is performed after an incoming call is notified by way of sound or vibration, and the reception process is terminated by disconnecting the line when a communications terminating operation is performed.

In step ST20, it is determined whether or not the selected response operation is the second response operation for leaving a text message. If the selected response operation is determined in step ST20 to be the second response operation, the process proceeds to step ST21, and if it is not the second response operation, that is, if the selected response operation is the third response operation for recording a voice message using the automatic voice recording function, the process proceeds to step ST22.

In step ST21, an automatic text message recording process is performed. Namely, an instruction to transmit a text message is given to the caller, and the text message supplied from the caller according to this instruction is recorded in the RAM of the control section 30 of the wireless telephone device 20 or in a service center provided on the carrier side. Upon completion of recording the text message, line disconnection is performed to terminate the reception process.

In step ST22, an automatic voice recording process is performed. Namely, an instruction prompting the caller to input voice is given, and audio signals supplied from the caller according to this instruction is recorded in the RAM of the control section 30 of the wireless telephone device 20 or in the service center provided on the carrier side. Upon completion of the automatic voice recording, line disconnection is performed to terminate the reception process.

In this manner, when the operation mode is set to the suppression mode, should area information be supplied, the area information is used to generate an absence notification message, and upon reception of an incoming call, because an automatic response is performed and the generated absence notification message is notified, an appropriate absence notification message corresponding to the type of the communications suppressing area can be automatically notified without having to operate the wireless telephone device to generate the absence notification message corresponding to the type of the communications suppressing area, or to select the absence notification message to be notified. In addition, because the caller can identify the reason communications is being suppressed, the caller can respond appropriately to the suppression of communications. Further, since the response operation can be selected on the caller side, the best operation depending on the urgency of the content to be communicated can be selected.

Although explanations are given with respect to cases where wireless LAN, Bluetooth or the like are used as the wireless interface in the embodiment described above, it is also possible to connect an optical signal outputting device to the transmitter 12 or the transmitter 16 to perform optical communications with the wireless telephone device 20 and to switch the operation mode of the wireless telephone device 20.

Further, although it is described above that the transmission control information is supplied to the transmitters 12 and 16 from the content server 70 via the network 60 in order to control the antennas 11 and 15 remotely such that the communications suppressing signals and the suppression releasing signals are transmitted, respectively, it is also possible to vary the range for the communications suppressing area from a remote position by controlling the transmission power of, for example, the transmitter 12 by way of transmission control information. In addition, if the transmitters 12 and 16 only output preset signals and there is no need for remote control, the communications suppressing area setting means and the communications suppression releasing means can be configured without the network 60 or the content server 70.

The preferred embodiment described herein is illustrative and not restrictive, the scope of the present invention being indicated by the appended claims and all variations which come within the meaning of the claims are intended to be embraced therein.

What is claimed is:

1. A communications control method comprising:

setting a reception range for a communications suppressing signal transmitted using a wireless transmission interface to form a communications suppressing area, wherein said reception range for said communications suppressing area is set remotely by a content server via a communications network, said communications suppressing signal has area information indicating a type of place of said communications suppressing area, and said wireless transmission interface is adapted to communicate with a first wireless interface of a wireless telephone device; and performing an automatic response by automatically sending a notification message generated by a respective wireless telephone device to a caller without any assistance from a user when the respective wireless telephone device receives an incoming call from the caller using a second wireless interface that performs communications via a base station and when said respective wireless telephone device receives said communications suppressing signal through said first wireless interface, in which said notification message provides an indication of the type of place in which said respective wireless telephone device is currently located based on the area information obtained from the communications suppressing signal.

2. The communications control method according to claim 1, further comprising:

transmitting a suppression releasing signal by using said wireless transmission interface; and when said wireless telephone device receives said suppression releasing signal through said first wireless interface, deactivating said automatic response to said incoming call, and performing a calling process upon reception of an incoming call.

3. The communications control method according to claim 1, further comprising deactivating said automatic response to said incoming call when said communications suppressing signal is not received for a predetermined period of time, and performing a calling process upon reception of said incoming call.

4. The communications control method according to claim 1, wherein the type of place is a theatre, a conference room, a classroom, an automobile, or a train.

5. A communications control system comprising:

communications suppressing area setting means for setting a reception range for a communications suppressing signal to form a communications suppressing area, wherein said reception range for said communications suppressing area is setable remotely by a content server via a communications network, said communications suppressing signal has area information indicating a type of place of said communications suppressing area, and said communications suppressing signal is transmittable through a wireless transmission interface; and a wireless telephone device for performing communications via a base station using a wireless transceiver interface, wherein said wireless telephone device includes:

reception means including a wireless receiver interface for receiving said communications suppressing signal transmitted through said wireless transmission interface; and control means for performing an automatic response by automatically sending a notification message generated by said wireless telephone device to a caller without any assistance from a user when receiving an incoming call from the caller using said wireless transceiver interface and when said reception means receives said communications suppression signal, in which said notification message provides an indication of the type of place in which said wireless telephone device is currently located based on the area information obtained from the communications suppressing signal.

6. The communications control system according to claim 5, further comprising:

communications suppression releasing means for transmitting a suppression releasing signal using said wireless transmission interface, wherein said control means deactivates said automatic response to said incoming call when said suppression releasing signal is received by said reception means, and a calling process is performed upon reception of said incoming call.

7. The communications control system according to claim 5, wherein said control means deactivates said automatic response to said incoming call when said communications suppressing signal is not received by said reception means for a predetermined period of time, and a calling process is performed upon reception of said incoming call.

8. The communications control system according to claim 5, wherein the type of place is a theatre, a conference room, a classroom, an automobile, or a train.

* * * * *